United States Patent
Hikosaka

(10) Patent No.: US 8,390,830 B2
(45) Date of Patent: Mar. 5, 2013

(54) PRINTING CONTROL DEVICE, PRINTING AND PRINTING CONTROL METHOD WITH CONTROLS FOR CANCELING SECURITY IMAGE

(75) Inventor: Ariyoshi Hikosaka, Osaka (JP)

(73) Assignee: Kyocera Mita Corporation (JP)

( * ) Notice: Subject to any disclaimer, the term of this patent is extended or adjusted under 35 U.S.C. 154(b) by 564 days.

(21) Appl. No.: 12/510,356

(22) Filed: Jul. 28, 2009

(65) Prior Publication Data

US 2010/0027047 A1 Feb. 4, 2010

(30) Foreign Application Priority Data

Jul. 29, 2008 (JP) ................................. 2008-194774
Jul. 3, 2009 (JP) ................................. 2009-158597

(51) Int. Cl.
*G06F 3/12* (2006.01)
*G06K 15/00* (2006.01)
*H04N 1/40* (2006.01)

(52) U.S. Cl. ..................... 358/1.13; 358/1.15; 358/1.16; 358/3.28

(58) Field of Classification Search ................. 358/1.13, 358/1.15, 1.16, 3.28
See application file for complete search history.

(56) References Cited

U.S. PATENT DOCUMENTS

| 5,689,626 | A * | 11/1997 | Conley ......................... 358/1.18 |
| 6,628,417 | B1 * | 9/2003 | Naito et al. .................. 358/1.15 |
| 7,120,273 | B2 * | 10/2006 | Robins et al. ................ 382/100 |
| 7,251,047 | B2 * | 7/2007 | Meade, II ..................... 358/1.13 |
| 2003/0098993 | A1 * | 5/2003 | Ohara .......................... 358/1.15 |
| 2004/0158724 | A1 * | 8/2004 | Carr et al. ..................... 713/186 |
| 2005/0094161 | A1 * | 5/2005 | Do et al. ........................ 358/1.1 |
| 2006/0066880 | A1 * | 3/2006 | Miyazaki et al. .............. 358/1.1 |
| 2008/0100870 | A1 * | 5/2008 | Fujii et al. ..................... 358/3.2 |
| 2008/0129758 | A1 * | 6/2008 | Fox et al. ...................... 345/661 |
| 2009/0073482 | A1 * | 3/2009 | Tsuchiya ..................... 358/1.14 |

FOREIGN PATENT DOCUMENTS

| JP | 2005-184408 | 7/2005 |
| JP | 2006-197022 | 7/2006 |
| JP | 2007-323579 | 12/2007 |

* cited by examiner

*Primary Examiner* — Ming Hon
(74) *Attorney, Agent, or Firm* — Gerald E. Hespos; Michael J. Porco; Matthew T. Hespos

(57) ABSTRACT

When a selection for canceling a security image is input at a client computer, then a password authentication unit causes a display unit to display a password reception screen, whereby an input password is compared with an authentication password stored in a password storage unit. When the passwords are matching, the print data generation unit of the client computer generates print data without adding a security image to the original data, and outputs the print data to a print server. A control unit of the print server transfers the print data to a printer, a print log acquisition unit acquires print log information from the printer, and the print log information and print data are stored in a print information storage unit.

8 Claims, 9 Drawing Sheets

PRINTING CONTROL DEVICE, PRINTING AND PRINTING CONTROL METHOD WITH CONTROLS FOR CANCELING SECURITY IMAGE

BACKGROUND OF THE INVENTION

1. Field of the Invention

The present invention relates to technology which enables the cancellation of the addition of a security image, while maintaining security, in a case where a visible security image is added to print data.

2. Description of the Related Art

As a method for restricting the reproduction of a confidential document, or the like, a method is known which uses a pattern image containing a warning text that emerges on a reproduction, when the confidential document is reproduced by a copying machine. When a confidential document on which a pattern image of this kind has been printed is reproduced by the copying machine, a warning text, such as "Reproduction prohibited", or the like, is printed over the reproduction, thus having a psychological effect in restricting unauthorized reproduction, as well as making it possible to distinguish the original document from a reproduction. Aside from this, there is also known a copying machine which is equipped with a copy guard function that prohibits reproduction of an original document by means of the copying machine recognizing a reproduction prohibition pattern, which is printed as a dot pattern together with the original document image, if it is sought to copy the original document.

Moreover, there is also known an image forming device in which users who are to have access authorization for printing, or the like, in respect of a confidential document are registered by the creator of the original document upon creation of the confidential document, and a watermark is added and printed on the confidential document if a user who does not have access authorization carries out printing of the confidential document.

SUMMARY OF THE INVENTION

The present invention further improves the prior art technology described above.

In other words, the present invention is a printing control device, comprising: a security print selection reception unit which receives an input of a selection indicating whether or not to cancel an addition of a visible security image; a print data generation unit which generates print data to which the security image has been added when a selection input for canceling the addition of the security image has not been received by the security print selection reception unit, and which generates print data to which the security image has not been added when a selection input for canceling the addition of the security image has been received by the security print selection reception unit; a printing control unit which outputs the print data to the printing device; a print log acquisition unit which acquires print log information when the print data to which the security image has not been added has been generated by the print data generation unit; and a print information storage unit which stores the print log information and the print data when the print data to which the security image has not been added has been generated by the print data generation unit.

These and other objects, features and advantages of the present invention will become more apparent upon reading of the following detailed description along with the accompanied drawings.

DETAILED DESCRIPTION OF THE PREFERRED EMBODIMENTS

Figure 1:
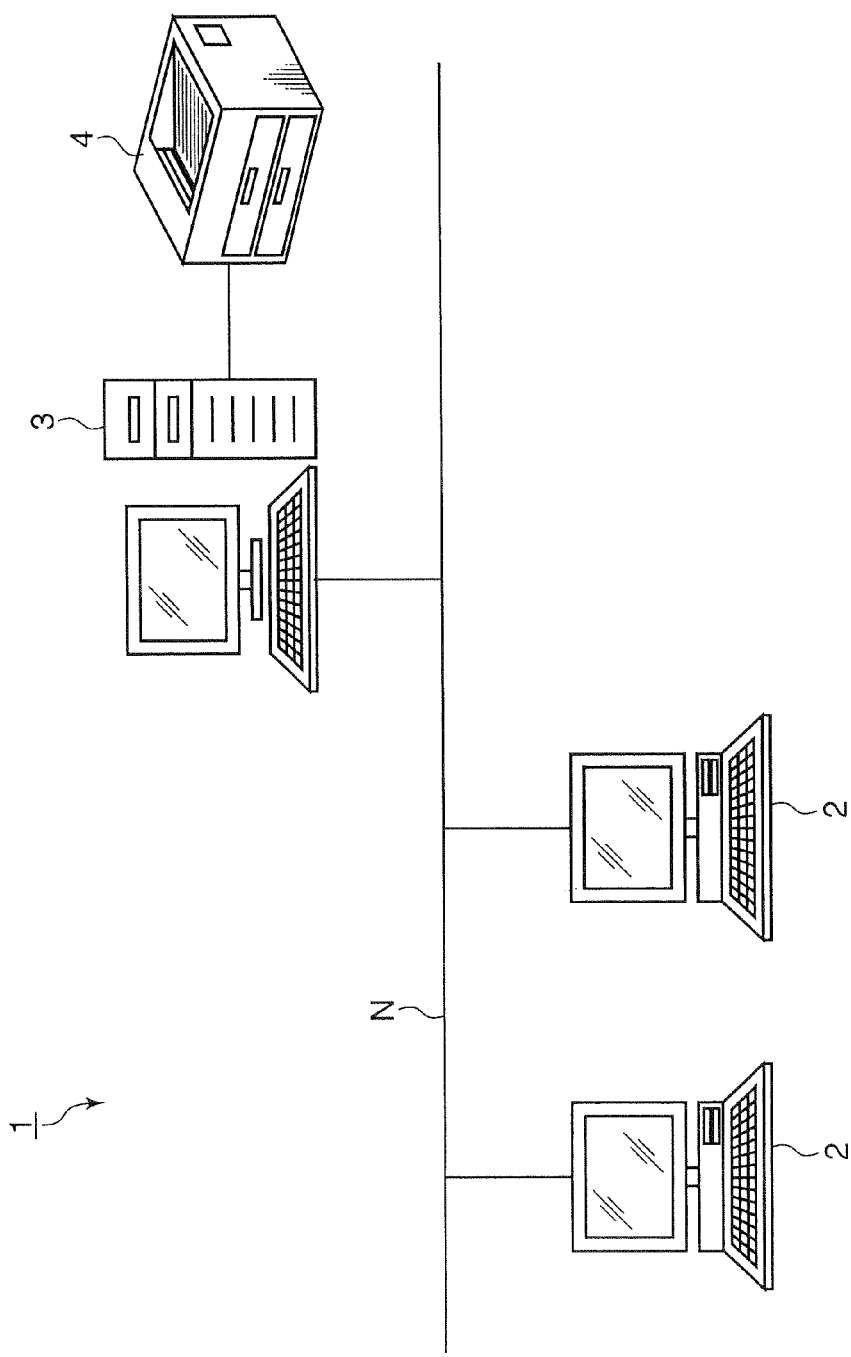
FIG. 1 is a diagram showing the composition of a printing system.

Below, a printing control device, a printing system and a printing control method relating to one embodiment of the present invention are described. FIG. 1 is a diagram showing the composition of the printing system 1. The printing system 1 comprises a client computer (hereinafter, simply called "client") 2, a print server 3 and a printer 4. The client 2 and the print server 3 are connected via the network N. The print server 3 and the printer 4 are connected directly.

The client 2 may be a personal computer or a PDA (Personal Digital Assistant). The client 2 sends a print request together with print data, such as text or images, to the print server 3 via the network N. The client 2 may be one or a plurality of devices, which are respectively connected to the network N.

The client server 3 performs control for causing the printer 4 to print text or images based on the print data, in response to a print request sent from the client 2. In particular, if there are a plurality of clients 2, then even if print requests are output simultaneously from a plurality of clients 2. The print server 3 processes these print requests appropriately and makes the printer 4 carry out printing in a correct sequence, for example. The print server 3 may be a personal computer or special server device.

Furthermore, the print server may also be incorporated inside the printer, assuming that the printer is connected to the network N. In this case, the print server 3 and the printer 4 are constituted by one device, but in the present embodiment, the print server 3 and the printer 4 are described as separate devices.

The printer 4 is an image forming device which operates under the control of the print server 3, and prints text or images onto a recording paper, or the like, on the basis of print data transferred from the print server 3. The printer 4 may also be a copying machine, or a multi-function peripheral, which has the functions of a copier, a printer, a facsimile and a scanner, or the like. The network N is a computer network, which may be a LAN (Local Area Network), or the like.

Here, a visible security image, such as a pattern image, dot pattern, watermark, or the like, (hereinafter, simply called "security image") is appended automatically to the print data included in the print job which is sent to the print server 3 from the client 2. In other words, when the user carries out a print operation for text or images from the client 2, the client 2 generates print data in which a security image is automatically added to the texts or images, and this print data is sent to the print server 3. The print server 3 transfers the received print data to the printer 4, and the printer 4 carries out printing for superimposing a security image onto the texts or images.

Figure 2:
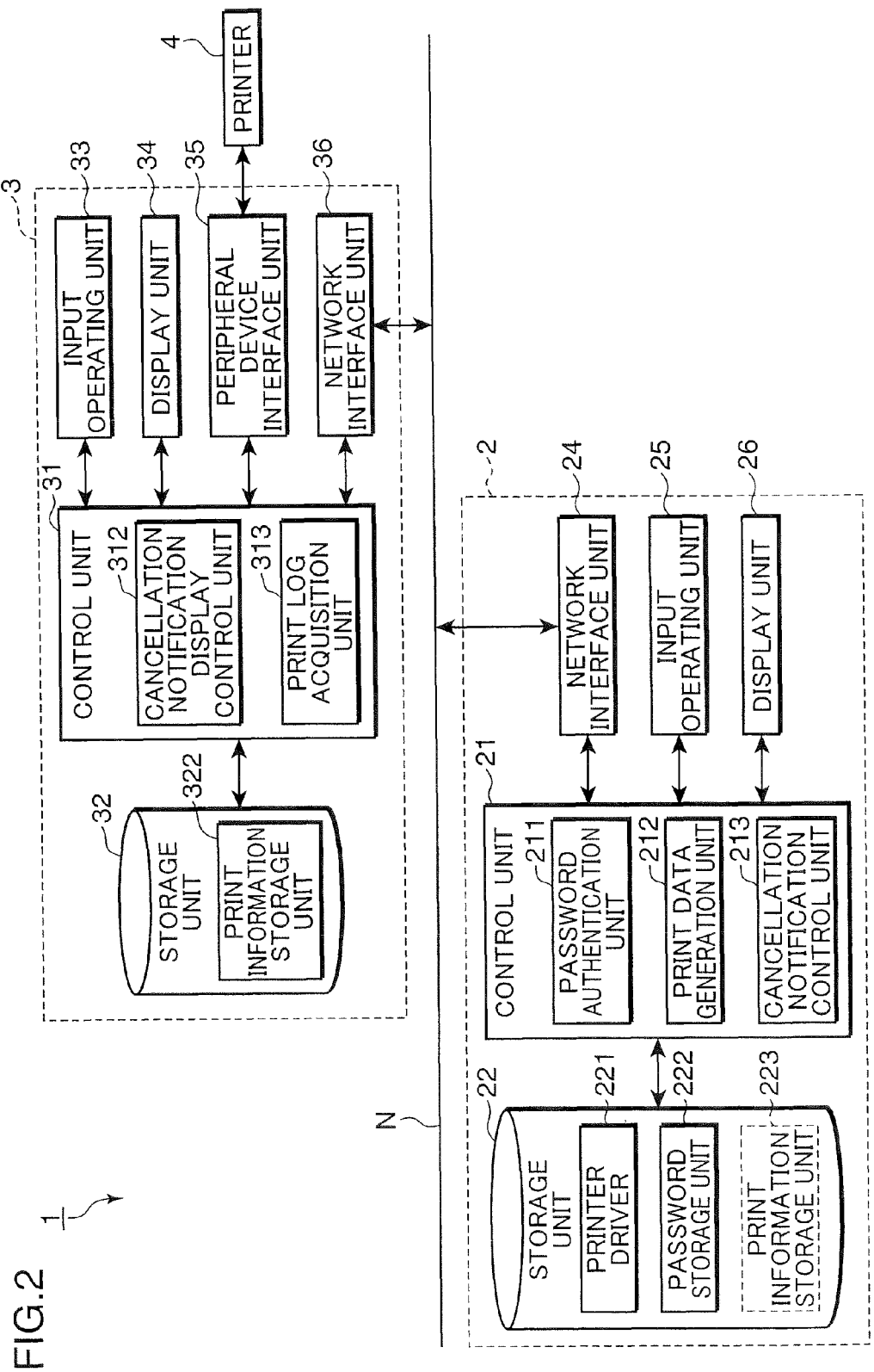
FIG. 2 is a functional block diagram showing the electrical composition of the respective devices which constitute the printing system.

FIG. 2 is a functional block diagram showing the electrical composition of the respective devices which constitute the printing system 1. The client 2 has a control unit 21, a storage unit 22, a network interface unit 24, an input operating unit 25 and a display unit 26. The control unit 21 has a CPU (Central Processing Unit), or the like, which reads out and executes a program stored in the storage unit 22 in accordance with an input instruction signal, or the like, and controls the client 2 comprehensively by outputting instruction signals and transferring data, and the like to the respective functional section of the client 2. Furthermore, the control unit 21 also comprises a password authentication unit 211, a print data generation unit 212 and a cancellation notification control unit 213.

The password authentication unit 211 causes a password reception screen to be displayed on the display unit 26 when the user has issued via the input operating unit 25 an instruction for canceling the addition of a security image during the execution of the printer driver 221, and compares a password input by the user from the input operating unit 25 with an authentication password stored in the password storage unit 222, which is described in detail below and which constitutes the storage unit 22, and judges whether or not the passwords input accords with the authentication password.

In the present embodiment, authentication of a user having the authority to perform cancellation of the addition of a security image is carried out on the basis of a password constituted by alphanumeric characters and numbers, but apart from this it is also possible to employ authentication using a code number consisting of numbers, authentication using an IC card, biological authentication based on the user's fingerprint or veins, or the like. Furthermore, it is also possible to use a combination of a plurality of these authentication methods. Moreover, it is also possible to store the identification number of a user having the authority to perform cancellation of the addition of a security image and a log-in password, or the like, so that authentication is carried out on the basis of this identification number and this log-in password.

The print data generation unit 212 generates print data to be sent to the print server 3. More specifically, the print data generation unit 212 generates print data by adding a security image to the document data or the image data created by reading out and executing the printer driver 221 stored in the storage unit 22. If it is judged that the password input matches the authentication password by the password authentication unit 211, then the print data generation unit 212 sets as the print data the document data or the image data desired for printing by the user, without adding a security image to the document data or the image data.

The cancellation notification control unit 213 controls the network interface unit 24 so as to issue a cancellation notification message indicating to the print server 3 that the addition of a security image has been cancelled, if print data to which a security image is not added has been generated by the print data generation unit 212. This cancellation notification message is sent in order that the system administrator (security manager) is able to ascertain via the print server 3 that the addition of a security image has been cancelled, and sending this message serves to prevent decline in security due to the cancellation of the addition of a security image.

The storage unit 22 stores system programs, application programs, data, and the like, for achieving various functions provided in the client 2. In the present embodiment, the storage unit 22 stores a printer driver 221 and functions as a password storage unit 222. The printer driver 221 is a printer driver for sending print data to the print server 3 and causing the printer 4 to print the print data, and forms a program which enables selection of whether or not to add a security image.

The password storage unit 222 stores an authentication password required in order to permit cancellation of the addition of a security image. The system administrator determines an authentication password in advance, and stores the authentication password in the password storage unit 222. The system administrator communicates the authentication password to persons who have the authority to cancel the addition of a security image. When a user who knows the authentication password inputs the authentication password while carrying out a printing process in the client 2, then the user is able to cause the printer 4 to print an image to which a security image is not added. On the other hand, a user who does not know the authentication password is not able to enter the correct password and therefore is not able to print the image data without the addition of a security image.

The network interface unit 24 is constituted by a communications module, such as a LAN board, and sends and receives data to and from another client 2, the print server 3, or external devices (which are not illustrated), via the network N which is connected to the network interface unit 24.

The input operating unit 25 comprises a pointing device, such as various operating buttons or a mouse, and when the user performs an operation, an operating signal is output to the control unit 21. The display unit 26 is a display screen, such as a liquid crystal display, and performs a display corresponding to the contents input from the input operating unit 25, or displays the processing contents and processing results of the control unit 21.

The print server 3 comprises a control unit 31, a storage unit 32, an input operating unit 33, a display unit 34, a peripheral device interface 35 and a network interface unit 36. The parts of the composition of the print server 3 which have a similar composition to the client 2 (for example, constituent elements having the same name) are not described in detail here.

The control unit 31 performs overall control of the print server 3 and has a cancellation notification display control unit 312 and a print log acquisition unit 313. The cancellation notification display control unit 312 inputs, via the network interface unit 36, a cancellation notification message sent from the client 2 which indicates that cancellation of the addition of a security image has been implemented, and executes control for causing this fact to be displayed on the display unit 34. Alternatively, cancellation notification messages are stored in the storage unit 32, and when the system administrator inputs an instruction for displaying cancellation notification messages via the input operating unit 33, the cancellation notification display control unit 312 executes a control to cause the display unit 34 to display the cancellation notification messages that have been stored in the storage unit 32.

The print log acquisition unit 313 acquires from the printer 4 the print log information relating to print jobs processed by the printer 4. Alternatively, the print log acquisition unit 313 acquires from the client 2 print log information generated when a print request has been made by the client 2. The print log information is information which indicates the results of carrying out print processing, such as the identification number of a user who has issued a print instruction, the identification number of a client 2, the date and time at which a print instruction was issued, the file name of the print data, and so on.

The storage unit 32 stores system programs, application programs, data, and the like, for achieving various functions provided in the print server 3, and functions as a print information storage unit 322. The print information storage unit 322 stores the print data and print log information acquired by the print log acquisition unit 313, when print data to which a security image has not been added is sent by the client 2. When the system administrator operates the input operating unit 33, the system administrator can monitor the print log information and print data stored in the print information storage unit 322 displayed on the display unit 34. The print data stored in the print information storage unit 322 may be data converted to a thumbnail image or binary data by the print log acquisition unit 313 in order to reduce the volume of data. The print log acquisition unit 313 converts the print data to a thumbnail image by size reduction processing or converts the print data to binary data by binarization processing. In this case, the print log acquisition unit 313 functions as a data conversion unit in the claims.

The peripheral device interface 35 is a hardware interface for connecting the print server 3 with peripheral devices, and may be a USB (Universal Serial Bus) or IEEE 1394 interface. In the present embodiment, the peripheral device interface 35 is connected to the printer 4.

Figure 3:
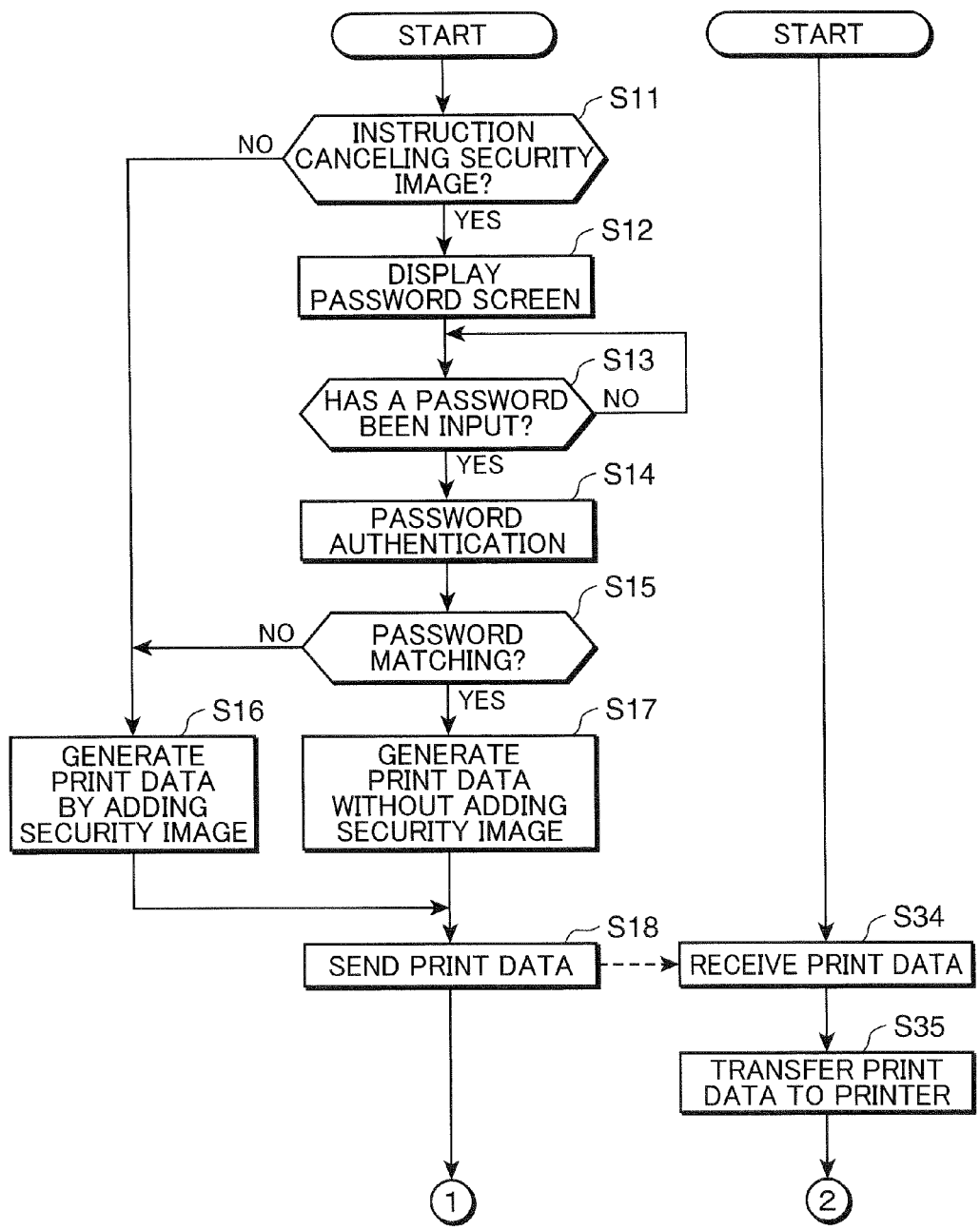
FIG. 3 is a flowchart showing the flow of printing control processing which is carried out when a printing control program is read out and executed.
Figure 4:
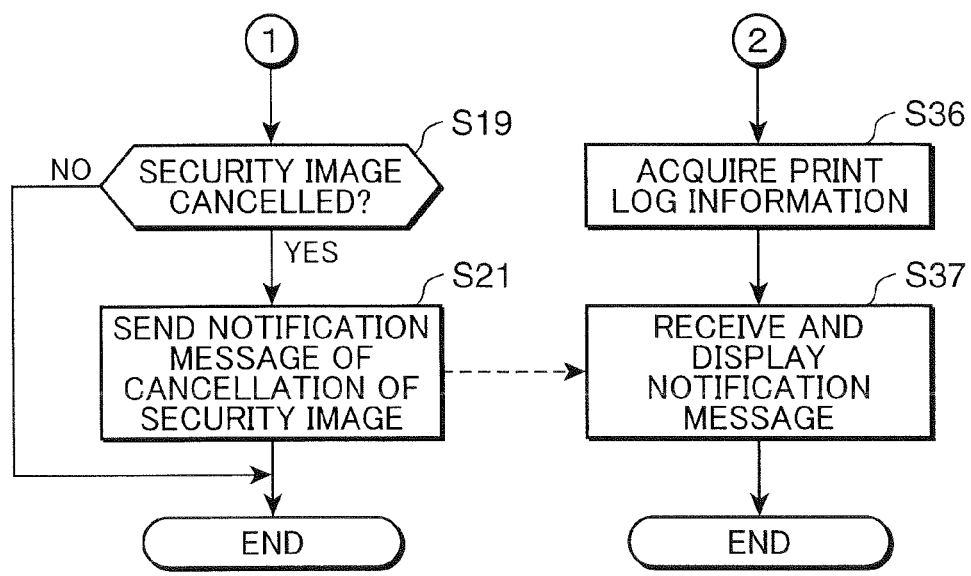
FIG. 4 is a flowchart showing the flow of printing control processing which is carried out when a printing control program is read out and executed.

Next, the flow of the printing control processing performed by the client 2 and print server 3 will be described. FIG. 3 and FIG. 4 are flowcharts showing the flow of printing control processing. The printing control processing according to the present embodiment is described together with the screen examples shown in FIG. 5.

Figure 5A:
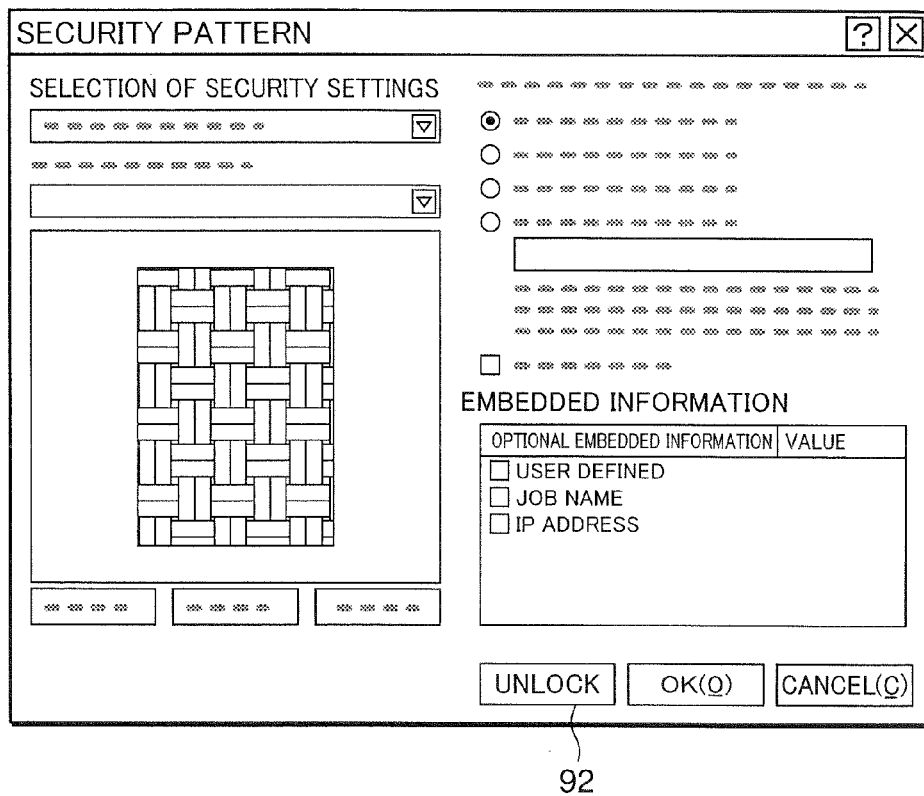
FIG. 5A and FIG. 5B are diagrams showing examples of screens displayed by the display unit of a client computer.
Figure 5B:
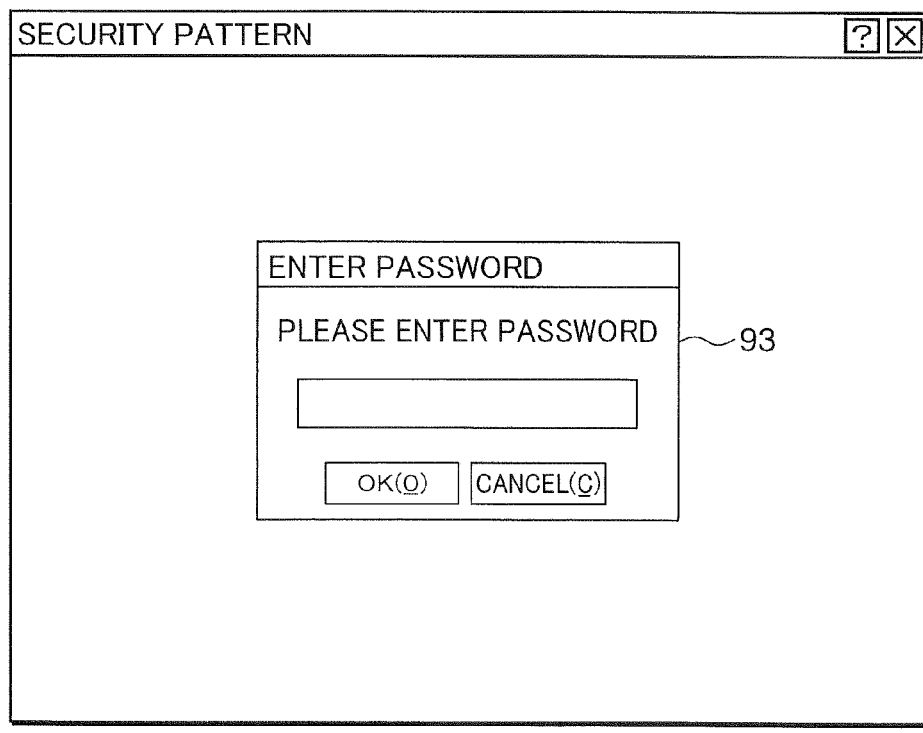

Firstly, the control unit 21 of the client 2 displays a print settings screen (not illustrated) on the display unit 26, and if an instruction canceling the addition of a security image is issued by an operation of the input operating unit 25 performed by the user, on the basis of the print setup screen, then a security image cancellation setting screen 91 such as that shown in FIG. 5A is displayed on the display unit 26. If the control unit 21 receives the selecting input of a cancellation button 92 (step S11; YES), the password authentication unit 211 displays on the display unit 26 a password reception screen 93 such as that shown in FIG. 5B (step S12). If a password is input to the password reception screen 93 by the user (step S13; YES), then the password authentication unit 211 compares the input password with an authentication password stored in the password storage unit 222. (step S14).

If the input password matches the authentication password (step S15; YES), the print data generation unit 212 sets the original data directly as the print data, without adding a security image to the document data or the image data (step S17). On the other hand, if the cancellation of the addition of a security image is not implemented at step S11 (step S11; NO), or if the input password and the authentication password do not match (step S15; NO), the print data generation unit 212 sets the document data or image data to which the security image is added as the print data (step S16). The control unit 21 sends the print data to the print server 3 (step S18).

When the control unit 31 of the print server 3 receives the print data, the control unit 31 transfers the print data to the printer 4 (step S35). The printer 4 receives this print data and prints the image corresponding to the print data on a recording medium. Moreover, if a security image has not been added to the print data, then the print log acquisition unit 313 acquires from the printer 4 print log information relating to a print job processed by the printer 4, and stores this print log information together with the print data, in the print information storage unit 322 (step S36). As described above, the print data stored in the print information storage unit 322 may be data obtained by means of the print log acquisition unit 313 converting the print data to thumbnail image or binary data.

Furthermore, on the side of the client 2, if the print data generation unit 212 has generated print data without adding a security image (step S19; YES), then the cancellation notification control unit 213 sends a cancellation notification message to the print server 3 (step S21). If the cancellation notification display control unit 312 of the print server 3 receives the cancellation notification message, then controls so that the display unit 34 shows a display indicating that the security image has been cancelled (step S37).

As described above, even in cases where the basic specifications are set so as print image data containing an added visible security image, such as a pattern image or watermark, it is possible to improve the legibility of the document or image by enabling the implementation of printing in which a security image is not added. Moreover, in a case where a security image is not added to the image data, by restricting the persons who are able to cancel the addition of a security image by carrying out authentication based on a password, or the like, and storing the print log information and image data whenever the addition of a security image is cancelled, it is possible to carry out printing without adding a security image while maintaining the security of the image data.

The present invention is not limited to the composition of the embodiment described above and various modifications are possible. For example, in the present embodiment, the print log information and the print data are stored in the print information storage unit 322 of the print server 3, but the storage unit 22 of the client 2 may function as a print information storage unit 223 and the print log information and the print data may be stored in the print information storage unit 223. In this case, the print log acquisition unit 313 may also be provided in either the print server 3 or the client 2. In this case, the system administrator performs an operation of acquiring on the print server 3 side via the network N the print log information and the print data stored in the print information storage unit 223 of the client 2 using the input operating unit 33 of the print server 3, and makes the acquired print log information and print data display on the display unit 34, thereby making it possible to confirm that image data has been printed without adding a security image.

Moreover, in the description given here, if the print data generation unit 212 has generated print data to which a security image has not been added, then the cancellation notification control unit 213 sends a cancellation notification message to the print server 3, but it is also possible to enable selection of whether or not to send a cancellation notification message. Furthermore, it is also possible to enable selection of whether to store the print log information and print data in the print information storage unit 322 or to send a cancellation notification message from the cancellation notification control unit 213.

Figure 6:
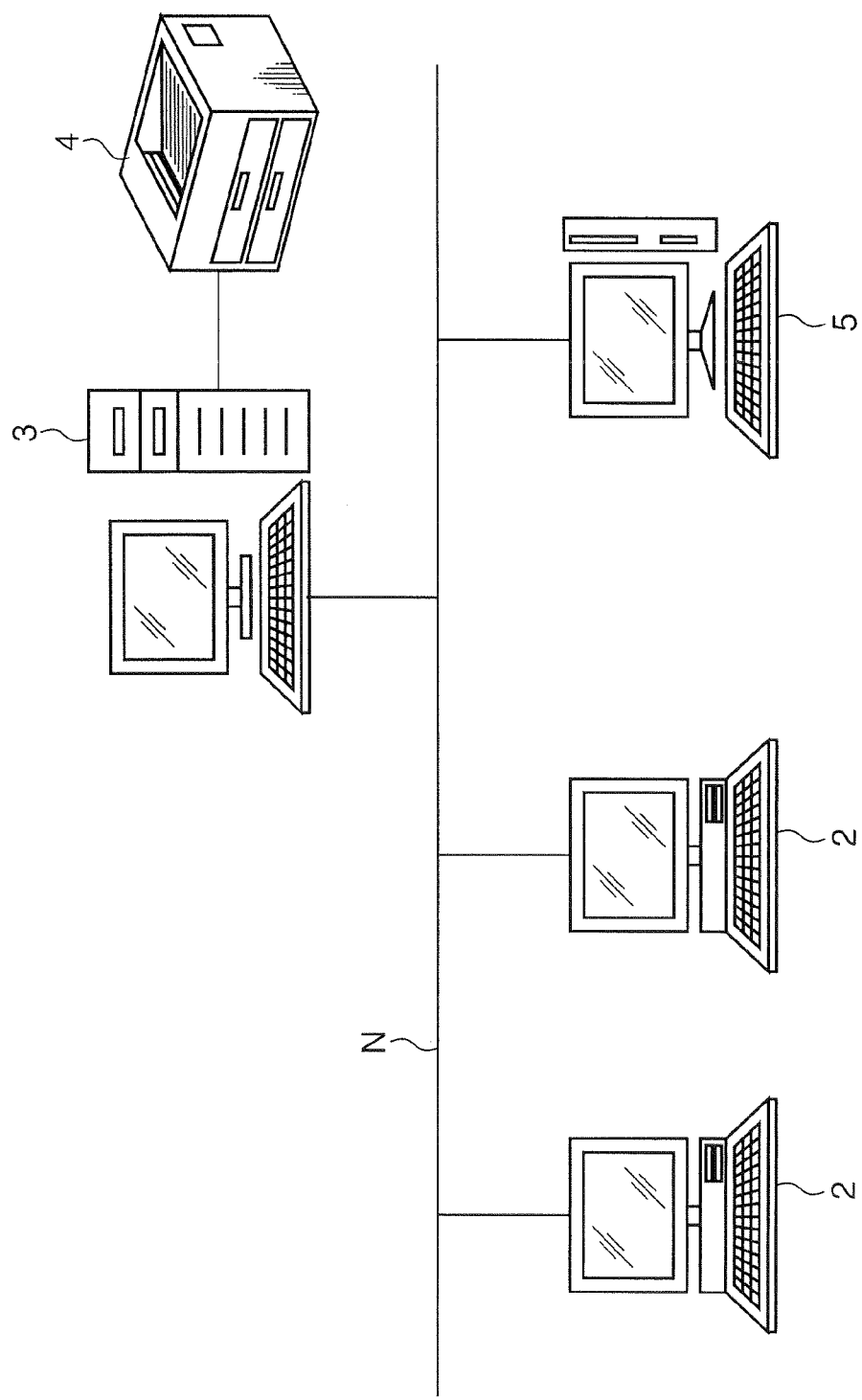
FIG. 6 is a diagram showing a modification example of a printing system.
Figure 7:
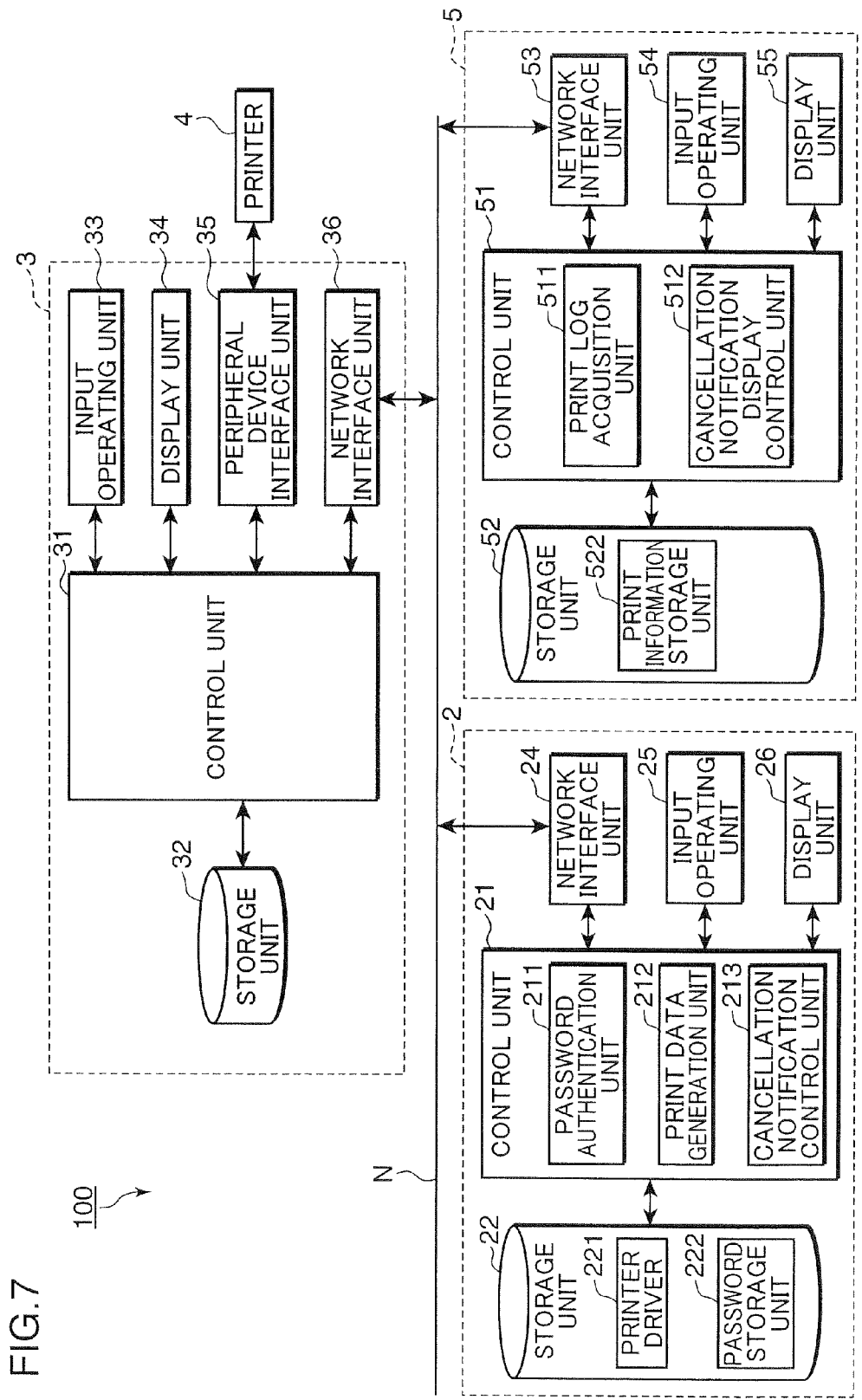
FIG. 7 is a functional block diagram showing the electrical composition of the respective devices relating to a further embodiment of a printing system.

FIG. 6 is a diagram showing a further embodiment of the printing system 1 illustrated in FIG. 1, and depicts a printing system 100 in which a management computer 5 which is operated by a system administrator performs the operations of storing print log information and the print data, and receiving cancellation notification messages indicating the cancellation of security. Furthermore, FIG. 7 is a functional block diagram showing the electrical composition of the respective devices which constitute the printing system 100. The parts of the composition of the management computer 5 which have a similar composition to the client 2 (for example, constituent elements having the same name) are not described in detail here.

The printing system 100 shown in FIG. 7 comprises a management computer 5. The management computer 5 comprises a control unit 51 which performs overall control of the management computer 5. The control unit 51 comprises a print log acquisition unit 511 and a cancellation notification display control unit 512. The storage unit 52 of the management computer 5 comprises the functions of the print information storage unit 522.

The control unit 21 of the client 2 sends the print data to the print server 3 and the management computer 5. If a security image has not been added to the print data, then the print log acquisition unit 511 of the management computer 5 acquires print log information relating to the print job processed by the printer 4, from the printer 4, via the print server 3, and stores the print log information and print data in the print information storage unit 522.

Furthermore, the cancellation notification display control unit 512 receives a cancellation notification message sent from the cancellation notification control unit 213 of the client 2, and causes the display unit 55 to display the display showing that a security image has not been added.

By this means, it is possible to achieve similar beneficial effects to those described above, in addition, for the system administrator the management computer 5 operated by the administrator is able to store print log information and print data to which a security image has not been added, as well as receive a notification message indicating that addition of a security image has not been performed, and therefore the administrator can readily ascertain the history of printing in which a security image has not been added and is able to manage security in an efficient manner.

Figure 8:
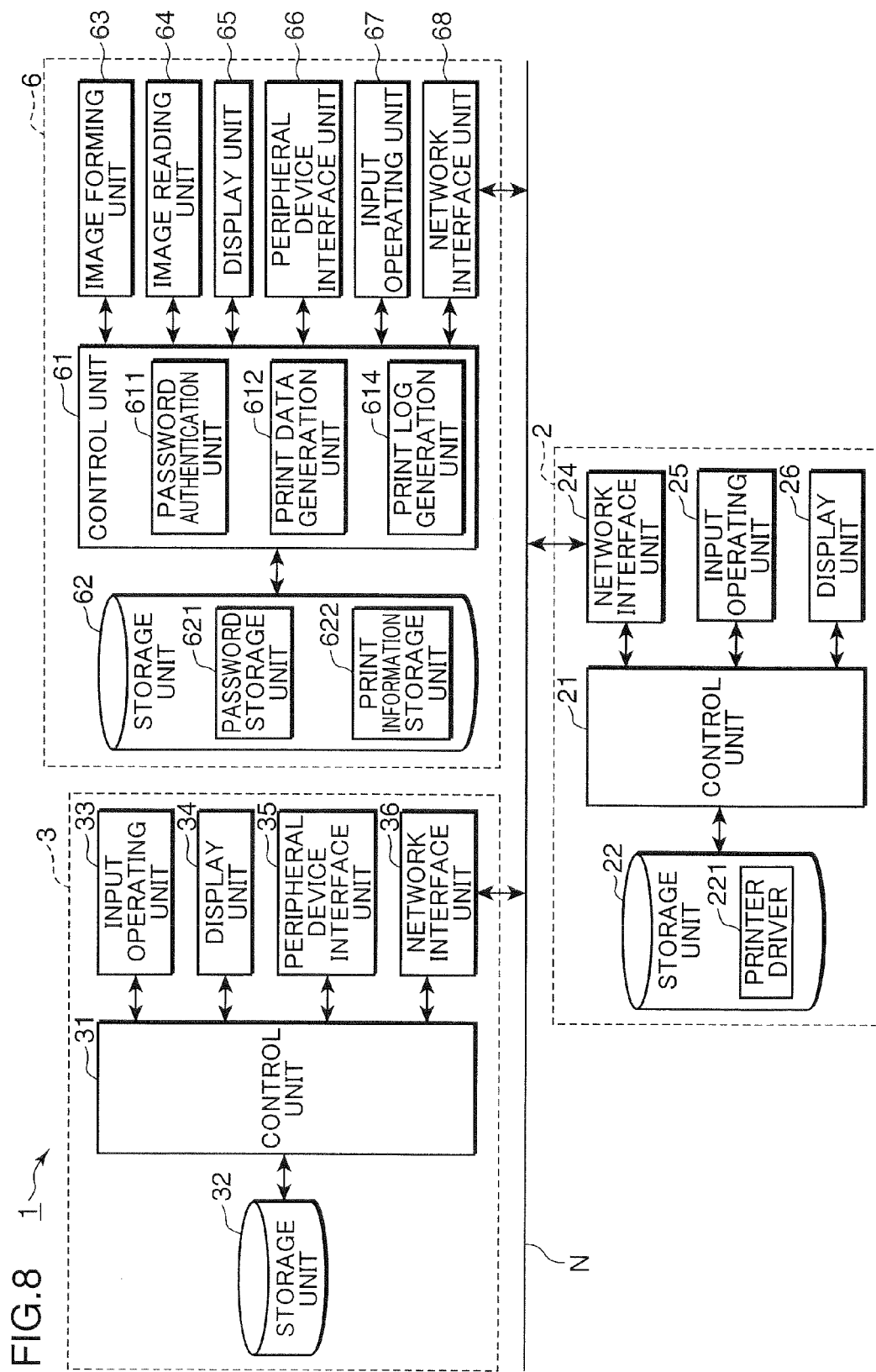
FIG. 8 is a functional block diagram showing the electrical composition of the respective devices relating to yet a further embodiment of a printing system.

Next, yet a further embodiment of the present invention will be described. The present embodiment shows an example in which the printing control device relating to the present invention is employed in a multi-function peripheral 6. FIG. 8 is a functional block diagram showing the electrical composition of the respective devices relating to yet a further embodiment of a printing system.

The multi-function peripheral 6 which employs the printing control device relating to the present invention is an image forming device that has a copying function, a facsimile function, a printer function and a scanner function. The multi-function peripheral 6 comprises: a control unit 61; a storage unit 62; an image forming unit 63; an image acquisition unit 64; a display unit 65; a peripheral device interface unit 66; an input operating unit 67; and a network interface unit 68. The image forming unit 63 functions as a printing device as described in the scope of the claims. In other words, the multi-function peripheral 6 incorporates a printing device as described in the scope of the claims.

The control unit 61 implements overall operational controls of the multi-function peripheral 6. The control unit 61 comprises a password authentication unit 611, a print data generation unit 612, and a print log generation unit 614.

In executing image formation in the image forming unit 63, when the user has input via the input operating unit 67 an instruction canceling the addition of a security image, the password authentication unit 611 displays a password reception screen on the display unit 65, and compares and judges whether or not there is a match between the password input by the user via the input operating unit 67 and the authentication password stored in the password storage unit 621 of the storage unit 62.

The print data generation unit 612 generates print data that is the object of image formation by the image forming unit 63. More specifically, the print data generation unit 612 generates print data by adding a security image to the document data or image data received by the network interface unit 68 from the client 2 via the print server 3, or image data of an original document read in by the image reading unit 64. If the password authentication unit 611 judges that the password input matches the authentication password, the print data generation unit 612 sets as the print data the document data or original document image data desired for printing by the user, without adding a security image to the document data or original document image data.

The print log generation unit 614 generates print log information relating to the print job in which image formation is carried out by the image forming unit 63.

The storage unit 62 stores system programs, application programs, data, and the like, for achieving various functions provided in the multi-function peripheral 6. In the present embodiment, the storage unit 62 functions as a password storage unit 621 and a print information storage unit 622.

The password storage unit 621 stores an authentication password required in order to permit cancellation of the addition of a security image. The authentication password is handled in the same manner as by the client 2 according to the embodiment shown in FIG. 2 described above.

The print information storage unit 622 stores the print data and/or the print log information generated by the print log generation unit 614, when print data to which a security image has not been added is formed as an image by the image forming unit 63. The control unit 61 displays the stored print log information or print data on the display unit 55, on the basis of an instruction input from the input operating unit 67 by the system administrator. The print data stored in the print information storage unit 622 may be data converted to a thumbnail image or binary data by the print log generation unit 614. In this case, the print log generation unit 614 functions as a data conversion unit in the claims.

The image forming unit 63 comprises, for example, a photosensitive drum, a charging device, an exposure device, a developing device, a transfer device, a fixing device, and the like, and performs image formation based on an electrophotographic method.

The image reading unit 64 has a scanner, or the like, which reads in an image of the original document that is to be copied or scanned, or the like.

The display unit 65, the peripheral device interface unit 66, the input operating unit 67 and the network interface unit 68 have a similar composition to the respective parts which are provided in the client 2 or the print server 3 in the embodiment shown in FIG. 2 which was described above.

Figure 9:
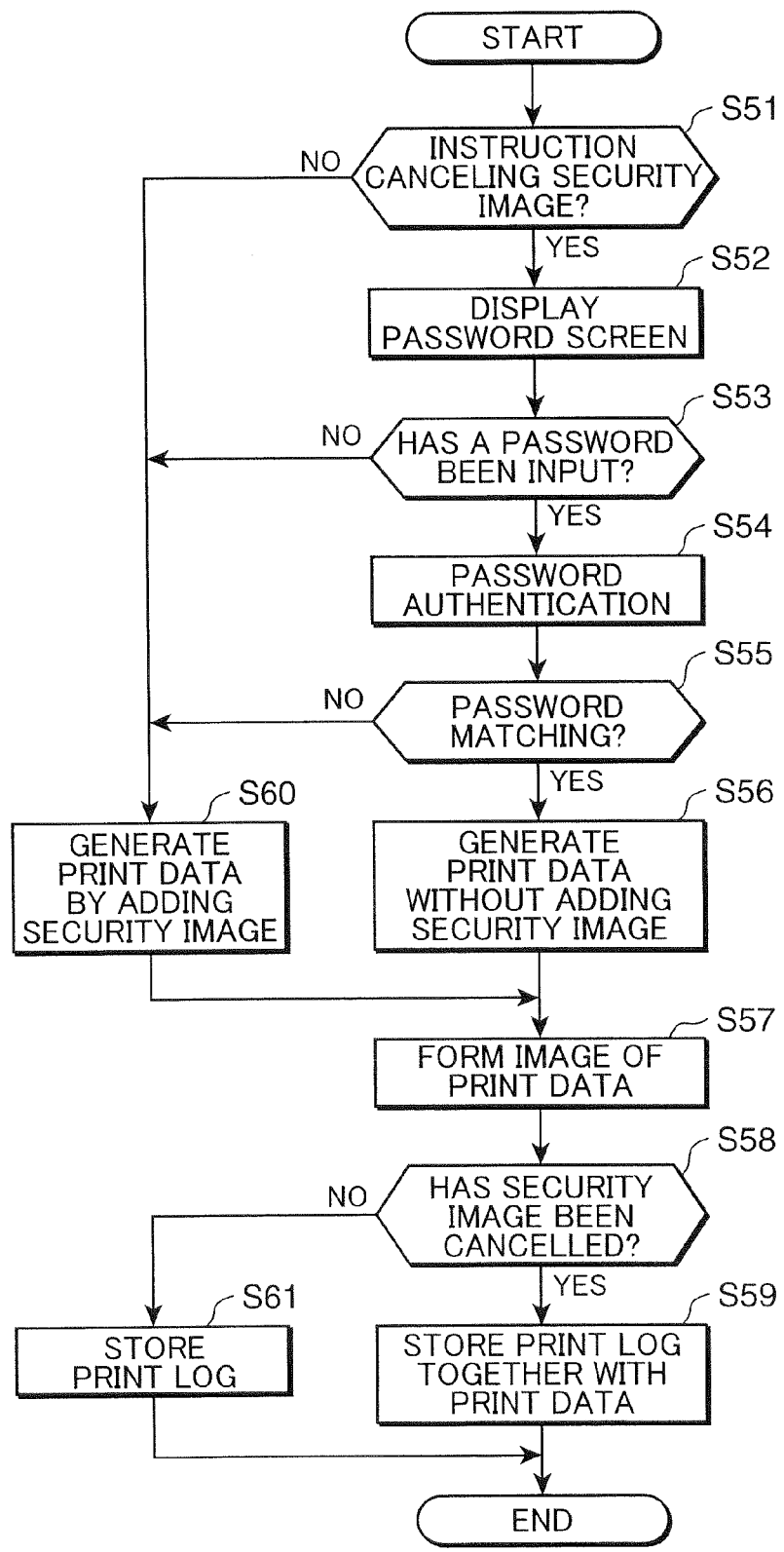
FIG. 9 is a flowchart showing the flow of printing control processing by the multi-function peripheral.

Next, the printing control processing carried out by the multi-function peripheral 6 will be described. FIG. 9 is a flowchart showing the flow of printing control processing by the multi-function peripheral.

Firstly, if the control unit 61 of the multi-function peripheral 6 has received print data from the client 2 during operation of the printer, or if an original document image has been read in by the image reading unit 64 during a copying operation, then the security image cancellation setting screen (not illustrated) is displayed on the display unit 65.

When the control unit 61 receives a security image cancellation instruction input by a user operating the input operating unit 67, during the display of the security image cancellation settings screen on the display unit 65 (YES at step S51), then the password authentication unit 611 displays a password reception screen (not shown) on the display unit 65 (step S52). If a password is input to the input operating unit 67 by the user (step S53; YES), then the password authentication unit 611 compares the input password with an authentication password stored in the password storage unit 621 (step S54).

If the input password matches the authentication password (step S55; YES), the print data generation unit 612 sets the original data directly as the print data, without adding a security image to the document data or the like, or the original document image data (step S56). On the other hand, if there is no instruction canceling the security image (step S51; NO) or if no password is input (step S53; NO), or if the input password and the authentication password are not matching (step S55; NO), then the print data generation unit 612 sets the document data, or the like, or the original document image data, to which a security image added, as print data (step S60).

The control unit 61 performs image formation (printing) on the basis of the print data in the image formation unit 63. Here, if the addition of a security image to the print data is cancelled (step S58; YES), the print log generation unit 614 stores the print log information relating to the print job, together with the print data, in the print information storage unit 622 (step S59). As described above, the print data stored in the print information storage unit 622 may be data obtained by converting the print data to thumbnail image or binary data.

On the other hand, if a security image is to be added to the print data (step S58; NO), then the print log generation unit 614 stores the print log information relating to the print job, in the print information storage unit 622 (step S61).

If the printing control device relating to the present invention is employed in a multi-function peripheral 6 in this way, in order to protect copyright when reproducing a book, for example, if specifications are adopted whereby a security image is added to the images formed in reproducing the original book, it is possible to adopt a control system whereby, for instance, a user who has obtained permission for reproduction from the author can input via the input operating unit 67 a password acquired from the author (a password for canceling the addition of a security image), and can thereby cancel the addition of the security image to the images formed in the reproduction of the book.

By adopting the present invention as described above, the beneficial effects described below are obtained.

According to the present invention, when carrying out printing in which a visible security image, such as a pattern image or watermark is automatically added, it is possible to improve the legibility of the document or image by making it possible to select printing which excludes (cancels) the security images, according to requirements. Furthermore, by storing print log information and print data whenever the addition of a security image is cancelled, then the action of illegally canceling the addition of a security image can be suppressed and decline in security due to the cancellation of the addition of a security image can be prevented.

For example, in the case of confidential documents, there are cases where only relevant persons or staff of relevant departments use the document for consultation purposes, and cases where the confidential documentation is recovered and cut with a shredder, or the like, immediately after consultation, and hence there is no need to add a pattern image or watermark to the document in order to prevent leaking of information. In cases of this kind, if a visible security image, such as a pattern image, a dot pattern as used in a copy guard function, or a watermark, or the like, is printed throughout the whole of a confidential document, the legibility of the document is impaired and the text or images become more difficult to discern. However, according to the invention described above, it is possible to cancel the addition of a visible security image in accordance with requirements, while maintaining the security of the original document.

Furthermore, according to the present invention, it is possible to restrict the persons who can cancel the addition of a security image by accepting the input of authentication information based on a password, or the like, and therefore it is possible to suppress the action of illegally canceling the security image, and hence decline in security due to the cancellation of the addition of the security image can be prevented.

Furthermore, according to the present invention, it is possible to cancel the security image while maintaining the security of the image data, by reporting the fact that the addition of a security image has been cancelled to a system administrator (security manager).

Furthermore, according to the present invention, by converting the print data into a thumbnail image or binary data, it is possible to reduce the data volume of the print data compared to a case where the print data is stored in its original state, and the storage volume of the print information storage unit can be reduced.

This application is based on Japanese Patent application serial No. 2008-194774 filed in Japan Patent Office on Jul. 29, 2008, and No. 2009-158597 filed in Japan Patent Office on Jul. 3, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A printing control device having a function that adds a visible security image automatically unless an instruction for canceling an addition of the security image is issued, comprising:
   an input operation unit by which an operation of the instruction for canceling the addition of the security image is performed;
   a print data generation unit that generates print data to which the security image has been added when the instruction for canceling the addition of the security image has not been performed by the input operation unit, and that generates print data to which the security image has not been added when the instruction for canceling the addition of the security image has been performed by the input operation unit;
   a printing control unit which outputs the print data to the printing device;
   a print log acquisition unit that acquires print log information when the print data to which the security image has not been added has been generated by the print data generation unit;
   a print information storage unit that stores the print log information and the print data when the print data to which the security image has not been added has been generated by the print data generation unit; and
   a cancellation notification control unit that sends a cancellation notification message to a computer used by a system administrator when the security image has not been added to the print data and does not send the cancellation notification message to the computer when the security image has been added to the print data, wherein
the printing device carries out printing processing without putting the security image when the security image has not been added to the print data output by the printing control unit and carries out print processing with putting the security image when the security image has been added to the print data output by the printing control unit.

2. The printing control device as defined in claim 1, further comprising:
an authentication information storage unit that stores authentication information;
an authentication information input reception unit which receives the input of the authentication information when the instruction for canceling the addition of the security image has been performed by the input operation; and
an authentication section that judges whether or not the authentication information received by the authentication information input reception unit matches the authentication information stored in the authentication information storage unit, wherein
when judgment is made by the authentication unit that the received authentication information does not match the authentication information stored in the authentication information storage unit, the print data generation unit generates print data to which the security image has been added, and judgment is made by the authentication unit that the received authentication information matches the authentication information stored in the authentication information storage unit, the print data generation unit generates print data to which the security image has not been added.

3. The printing control device as defined in claim 1, comprising:
a data conversion unit which converts the print data to a thumbnail image by size reduction processing or converts the print data to binary data by binarization processing, when the print data to which the security image has not added has been generated by the print data generation unit, wherein
the print information storage unit stores the thumbnail image or binary data converted by the data conversion unit, together with the print log information.

4. The printing control device as defined in claim 1, wherein,
the print information storage unit stores the print log information and does not store the print data when the print data to which the security image has been added has been generated by the print data generation unit.

5. A printing system comprising a client computer that issues a print request; a server that manages the print request; and a printing device that carries out print processing in accordance with control performed by the server, wherein
the client computer having a function that adds a visible security image automatically unless an instruction for canceling an addition of the security image is issued,
the client computer comprises:
an input operation unit by which an operation of the instruction for canceling the addition of the security image is performed;
a print data generation unit that generates print data to which the security image has been added when the instruction for canceling the addition of the security image has not been performed by the input operation unit, and which generates print data to which the security image has not been added when the instruction for canceling the addition of the security image has been performed by the input operation unit;
a first printing control unit that outputs the print data to the server; and
a cancellation notification control unit that sends a cancellation notification message to the server when the security image has not been added to the print data and does not send the cancellation notification message to the server when the security image has been added to the print data, wherein
the server comprises:
a second printing control unit that transfers the print data output by the first printing control unit to the printing device,
a print log acquisition unit that acquires print log information from the printing device, when a security image has not been added to the print data; and
a print information storage unit that stores the print log information and the print data, when a security image has not been added to the print data, wherein
the printing device carries out printing processing without putting the security image when the security image has not been added to the print data output by the second printing control unit and carries out print processing with putting the security image when the security image has been added to the print data output by the second printing control unit.

6. The printing system as defined in claim 5, wherein,
the print information storage unit stores the print log information and does not store the print data when the security image has been added to the print data.

7. A printing control method that performs adding a visible security image automatically unless an instruction for canceling an addition of the security image is issued, comprising:
an input operation step of performing an operation of the instruction for canceling the addition of the security image;
a print data generation step of generating print data to which the security image has been added when the instruction for canceling the addition of the security image has not been performed by the input operation step, and generating print data to which the security image has not been added when the instruction for canceling the addition of the security image has been performed by the input operation step;
a printing control step of outputting the print data to a printing device;
a print log acquisition step of acquiring print log information when the print data to which the security image has not been added has been generated;
a print information storage step of storing the print log information and the print data when the print data to which the security image has not been added has been generated; and
a cancellation notification control unit that sends a cancellation notification message to a computer used by system administrator when the security image has not been added to the print data and does not send the cancellation notification message to the computer when the security image has been added to the print data, wherein
the printing device carries out printing processing without putting the security image when the security image has not been added to the print data output by the printing control unit and carries out print processing with putting the security image when the security image has been added to the print data output by the printing control unit.

8. The printing control method as defined in claim 7, wherein, the print information storage step further includes storing the print log information but not storing the print data when the security image has been added to the print data.

* * * * *